United States Patent
Tsuji et al.

(10) Patent No.: US 9,898,070 B2
(45) Date of Patent: Feb. 20, 2018

(54) SEMICONDUCTOR INTEGRATED CIRCUIT AND POWER SUPPLY CONTROL METHOD THEREFOR

(71) Applicant: NEC CORPORATION, Tokyo (JP)

(72) Inventors: Yukihide Tsuji, Tokyo (JP); Noboru Sakimura, Tokyo (JP); Ryusuke Nebashi, Tokyo (JP); Ayuka Tada, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 294 days.

(21) Appl. No.: 14/786,453

(22) PCT Filed: Jan. 7, 2014

(86) PCT No.: PCT/JP2014/000019
§ 371 (c)(1),
(2) Date: Oct. 22, 2015

(87) PCT Pub. No.: WO2014/184985
PCT Pub. Date: Nov. 20, 2014

(65) Prior Publication Data
US 2016/0077563 A1 Mar. 17, 2016

(30) Foreign Application Priority Data
May 14, 2013 (JP) .................................. 2013-102502

(51) Int. Cl.
G06F 1/32 (2006.01)
G06F 13/40 (2006.01)

(52) U.S. Cl.
CPC .......... G06F 1/3287 (2013.01); G06F 1/3243 (2013.01); G06F 1/3209 (2013.01);
(Continued)

(58) Field of Classification Search
CPC .............................. G06F 1/3243; G06F 1/3287
See application file for complete search history.

(56) References Cited

U.S. PATENT DOCUMENTS

| | | | |
|---|---|---|---|
| 2008/0178030 A1 | 7/2008 | Koizumi | |
| 2009/0144571 A1* | 6/2009 | Tatsumi | G06F 1/26 713/320 |
| 2013/0015904 A1* | 1/2013 | Priel | G06F 1/3203 327/419 |

FOREIGN PATENT DOCUMENTS

| | | |
|---|---|---|
| JP | 61-285522 A | 12/1986 |
| JP | 2001-22480 A | 1/2001 |

(Continued)

OTHER PUBLICATIONS

International Search Report of PCT/JP2014/000019, dated Apr. 8, 2014. [PCT/ISA/210], English Translation.
(Continued)

*Primary Examiner* — Albert Wang
(74) *Attorney, Agent, or Firm* — Sughrue Mion, PLLC

(57) ABSTRACT

A semiconductor integrated circuit (100) comprising: a plurality of processing circuits (11, 12, 13) each including a notification units for outputting a notification signal according to the processing state of the own processing circuit; a plurality of power supply switch units (SW1, SW2, SW3) for switching the connection states between the respective processing circuits and a power supply source; a power supply switch control circuit which is connected with the notification means (111, 121, 131), stores power supply control information (101) including a plurality of connection statuses, and controls the connection states on the basis of the notification signals and the power supply control information; and a data bus (BS) and the like connecting each of the processing circuits and the power supply switch control circuit, wherein: at least two or more of the plurality of (Continued)

processing circuits update the power supply control information via the data bus and the like before outputting a notification signal; and the power supply switch control circuit accepts a notification signal outputted from any one of the plurality of processing circuits after the update, and accordingly controls the connection states of respective ones of the plurality of power supply switch units on the basis of the updated power supply control information.

10 Claims, 17 Drawing Sheets

(52) U.S. Cl.
CPC ....... *G06F 13/4022* (2013.01); *Y02B 60/1239* (2013.01); *Y02B 60/1282* (2013.01)

(56) References Cited

FOREIGN PATENT DOCUMENTS

| | | |
|---|---|---|
| JP | 2002-244761 A | 8/2002 |
| JP | 2008-181329 A | 8/2008 |
| JP | 2010-262362 A | 11/2010 |

OTHER PUBLICATIONS

Written Opinion of PCT/JP2014/000019, dated Apr. 8, 2014. [PCT/ISA/237], Partial English Translation.

\* cited by examiner

Fig. 4

| NOTIFICATION SIGNAL | CONNECTION STATE OF EACH SWITCH | | | | |
|---|---|---|---|---|---|
| | SW1 | SW2 | SW3 | ... | SWx |
| Ps1 | S(1, 1) | S(1, 2) | S(1, 3) | ... | S(1, x) |
| Ps2 | S(2, 1) | S(2, 2) | S(2, 3) | ... | S(2, x) |
| Ps3 | S(3, 1) | S(3, 2) | S(3, 3) | ... | S(3, x) |
| ... | ... | ... | ... | ... | ... |
| Psx | S(x, 1) | S(x, 2) | S(x, 3) | ... | S(x, x) |

Fig. 5

|      | SW1 | SW2 | SW3 |
|------|-----|-----|-----|
| Ps1  | OFF | OFF | ON  |
| Ps2  | ON  | OFF | OFF |
| Ps3  | OFF | ON  | OFF |

Fig. 1C

| POWER SUPPLY STATUS | CONNECTION STATE OF EACH SWITCH | | | | |
|---|---|---|---|---|---|
| | SW1 | SW2 | SW3 | ... | SWx |
| 1 | S(1, 1) | S(1, 2) | S(1, 3) | ... | S(1, x) |
| 2 | S(2, 1) | S(2, 2) | S(2, 3) | ... | S(2, x) |
| 3 | S(3, 1) | S(3, 2) | S(3, 3) | ... | S(3, x) |
| ... | ... | ... | ... | ... | ... |
| z | S(x, 1) | S(x, 2) | S(x, 3) | ... | S(x, x) |

Fig. 11

| CURRENT POWER SUPPLY STATUS | POWER SUPPLY STATUS TO BE TRANSITION DESTINATION | | | |
|---|---|---|---|---|
| | Next Status[1] | Next Status[2] | ... | Next Status[t_max] |
| 1 | y_next[1, 1] | y_next[1, 2] | ... | y_next[1, t_max] |
| 2 | y_next[2, 1] | y_next[2, 2] | ... | y_next[2, t_max] |
| 3 | y_next[3, 1] | y_next[3, 2] | ... | y_next[3, t_max] |
| ... | ... | ... | ... | ... |
| z | y_next[z, 1] | y_next[z, 2] | ... | y_next[z, t_max] |

SEMICONDUCTOR INTEGRATED CIRCUIT AND POWER SUPPLY CONTROL METHOD THEREFOR

CROSS REFERENCE TO RELATED APPLICATIONS

This application is a National Stage of International Application No. PCT/JP2014/000019 filed Jan. 7, 2014, claiming priority based on Japanese Patent Application No. 2013-102502, filed May 14, 2013, the contents of all of which are incorporated herein by reference in their entirety.

TECHNICAL FIELD

The present invention relates to a semiconductor integrated circuit and a power supply control method for the integrated circuit, and in particular, relates to a semiconductor integrated circuit comprising in each constituent circuit a power supply switch for controlling power supply, and to a power supply control method for the integrated circuit.

BACKGROUND ART

In recent years, in semiconductor integrated circuits, as a result of the advances in scaling, there have been increase in leakage current of transistors and resultant increase in standby power. For this reason, for example, there has been conducted an approach of installing a power supply switch SW for each circuit block CB, as shown in FIG. 14, thereby temporarily stopping power supply to a circuit block in a non-operating state, and consequently reducing the standby power.

For example, Patent Literature 1 discloses a technology relating to an automatic generation method for a table for power supply control. Patent Literature 2 discloses a technology relating to a semiconductor device or the like which, with respect to each functional block, precisely predicts a time period in which no access is made to the functional block and accordingly controls power supply to the functional block during the time period in which no access is made. Further, Patent Literature 3 discloses a technology relating to a semiconductor device or the like which makes it possible to reduce power consumption of the CPU (Central Processing Unit) domain in the operating mode.

CITATION LIST

Patent Literature

[Patent Literature 1] Japanese Patent Application Laid-Open No. Sho 61-285522
[Patent Literature 2] Japanese Patent Application Laid-Open No. 2010-262362
[Patent Literature 3] Japanese Patent Application Laid-Open No. 2008-181329

SUMMARY OF INVENTION

Technical Problem

Here, Patent Literature 1 to Patent Literature 3 can be regarded as power supply switch control methods. FIG. 15 is a block diagram schematically showing a configuration of a semiconductor integrated circuit 901 according to Patent Literature 1. The semiconductor integrated circuit 901 comprises circuits C91 to C93 and a power supply management unit (PMU) 90. The PMU 90 comprises a power supply control table (not illustrated) inside it. Then, the power supply switch control method according to Patent Literature 1 controls power supply switches SW1 and SW2 for the respective circuits C1 and C2, in accordance with the power supply control table rewritten by the circuit C3 arranged outside the PMU 90.

FIG. 16 is a block diagram schematically showing a configuration of a semiconductor integrated circuit 902 according to Patent Literature 2. The semiconductor integrated circuit 902 is a system in which circuits C1 to C3 and a power supply management unit (PMU) 91 are mutually connected via address and data buses (BS). The PMU 91 includes a bus monitor which monitors information on the address and data buses BS at any time. The bus monitor predicts the operational state of each of the circuits C1 to C3 and accordingly turns power supply switches SW1 and SW2 on or off. Patent Literature 2 is excellent particularly in having flexibility of turning off the circuit blocks (circuits C1 to C3) in accordance with its processing action.

However, in Patent Literature 1 and Patent Literature 2, no power supply switch is installed for the circuit C3 (for example, a central control circuit such as a CPU) which controls the PMU from outside. Accordingly, for example, in a process whose operational order is, as shown in FIG. 17, the circuit C3, the circuit C2, the circuit C1 and then again the circuit C3, the circuit C3 is always in the power on state. If a power supply switch is installed for the circuit C3, the power supply control table cannot be updated when the circuit C3 is in the OFF state. Therefore, in that case, the power supply switches cannot be controlled. The power supply switches cannot be controlled also when all of the circuits capable of operating the address and data buses are in the OFF states.

Patent Literature 3 discloses that, in response to an interrupt instruction from each functional block or a power supply control instruction from a CPU, signals for on/off control of respective power supply switches are outputted on the basis of an interruption power supply control table. Here, in Patent Literature 3, rewriting of the content of the interruption power supply control table has to be made via the CPU. Therefore, Patent Literature 3 has a problem in that the flexibility in power supply control is small and standby power loss may occur. This problem cannot be solved even by Patent Literature 1 or Patent Literature 2.

The present invention has been made in order to solve such a problem, and accordingly, its objective is to provide a semiconductor integrated circuit for increasing the flexibility in power supply control and a power supply control method for the semiconductor integrated circuit.

Solution to Problem

A semiconductor integrated circuit according to a first aspect of the present invention is characterized by that it is a semiconductor integrated circuit comprising:
a plurality of processing circuits each including a notification unit which outputs a notification signal in accordance with the processing state of the own processing circuit;
a plurality of power supply switch units which switch the connection states, which are each either a connected or a disconnected state, between respective ones of the plurality of processing circuits and a power supply source;
a power supply switch control circuit which is connected with the notification units included in respective ones of the plurality of processing circuits, stores power supply control information including the connection states of respective ones of the plurality of power supply switch units, and controls the connection states on the basis of the notification signal and the power supply control information; and address and data buses which connect each of the plurality of processing circuits and the power supply switch control circuit, wherein:

at least two or more of the plurality of processing circuits update the power supply control information via the address and data buses before outputting the notification signal; and the power supply switch control circuit accepts a notification signal outputted from any one of the plurality of processing circuits after the update, and controls the connection states of respective ones of the plurality of power supply switch units on the basis of the updated power supply control information.

A power supply control method for semiconductor integrated circuit according to a second aspect of the present invention is characterized by that it is a power supply control method for a semiconductor integrated circuit comprising:

a plurality of processing circuits each including a notification unit which outputs a notification signal in accordance with the processing state of the own processing circuit;

a plurality of power supply switch units which switch the connection states, which are each either a connected or a disconnected state, between respective ones of the plurality of processing circuits and a power supply source;

a power supply switch control circuit which is connected with the notification units included in respective ones of the plurality of processing circuits, stores power supply control information including the connection states of respective ones of the plurality of power supply switch units, and controls the connection states on the basis of the notification signal and the power supply control information; and address and data buses which connect each of the plurality of processing circuits and the power supply switch control circuit, wherein:

at least two or more of the plurality of processing circuits update the power supply control information via the address and data buses before outputting the notification signal; and the power supply switch control circuit accepts a notification signal outputted from any one of the plurality of processing circuits after the update, and controls the connection states of respective ones of the plurality of power supply switch units on the basis of the updated power supply control information.

Advantageous Effects of Invention

According to the present invention, it is possible to provide a semiconductor integrated circuit and power supply control method, for further increasing flexibility in power supply control.

BRIEF DESCRIPTION OF DRAWINGS

FIG. 4 is a diagram showing a definition of a power supply control table according to the exemplary embodiment 2 of the present invention.

FIG. 5 is a diagram showing an example of a power supply control table according to the exemplary embodiment 2 of the present invention.

FIG. 10 is a diagram showing an example of power supply statuses according to an exemplary embodiment 4 of the present invention.

FIG. 11 is a diagram showing an example of correlating between a power supply status before transition and that after transition, according to the exemplary embodiment 4 of the present invention.

DESCRIPTION OF EMBODIMENTS

Figure 1:
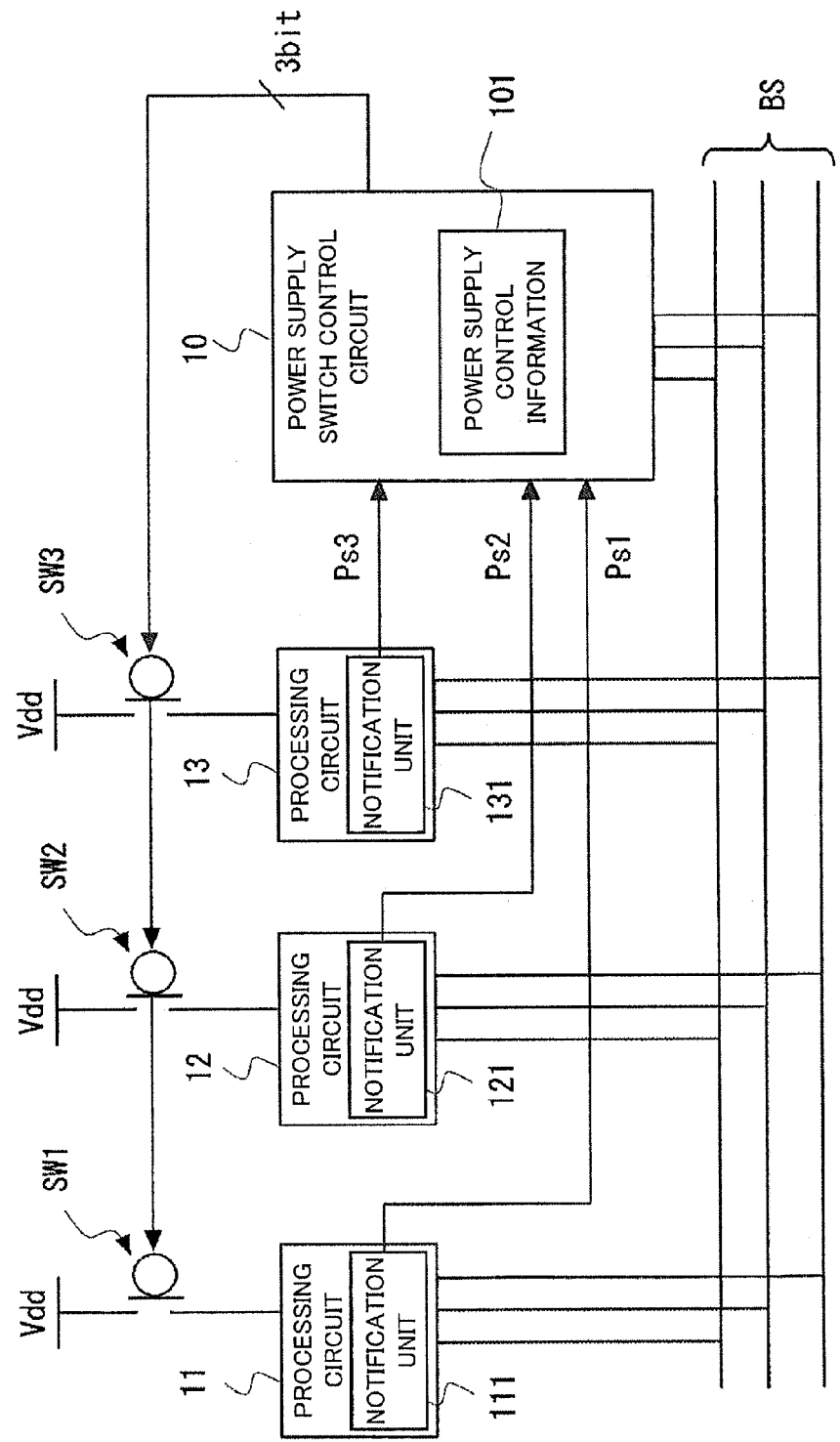
FIG. 1 is a block diagram showing a configuration of a semiconductor integrated circuit according to an exemplary embodiment 1 of the present invention.

Hereinafter, specific exemplary embodiments to which the present invention is applied will be described in detail with reference to drawings. In the drawings, the same sign will be assigned to the same constituent element, and duplicated description will be avoided as necessary, in order to make the descriptions clearer.

Exemplary Embodiment 1 of the Invention

FIG. 1 is a block diagram showing a configuration of a semiconductor integrated circuit 100 according to an exemplary embodiment 1 of the present invention. The semiconductor integrated circuit 100 comprises a power supply source Vdd, processing circuits 11 to 13, power supply switches SW1 to SW3, a power supply switch control circuit 10, and address and data buses BS. Here, the number of processing circuits is not limited to that described above, and may be any value equal to or larger than 2.

The processing circuit 11 is a circuit block including a notification unit 111 which outputs a notification signal Ps1 in accordance with the processing state of the own processing circuit. In addition, the processing circuit 12 is a circuit block including a notification unit 121 which outputs a notification signal Ps2 in accordance with the processing state of the own processing circuit. The processing circuit 13 is a circuit block including a notification unit 131 which outputs a notification signal Ps3 in accordance with the processing state of the own processing circuit.

The power supply switch SW1 is a power supply switch unit for switching the connection state, which is either a connected or a disconnected state, between the power supply source Vdd and the processing circuit 11. In addition, the power supply switch SW2 is a power supply switch unit for switching the connection state between the power supply source Vdd and the processing circuit 12. In addition, the power supply switch SW3 is a power supply switch unit for switching the connection state between the power supply source Vdd and the processing circuit 13.

The power supply switch control circuit 10 is connected with each of the notification units 111, 121 and 131, and stores power supply control information 101. The power supply control information 101 includes the connection states of respective ones of the plurality of power supply switch units SW1 to SW3. Then, the power supply switch control circuit 10 controls the connection states on the basis of the power supply control information 101 and any one of the notification signals Ps1 to Ps3. The address and data buses BS connect each of the processing circuits 11 to 13 with the power supply switch control circuit 10. Here, for the address and data buses BS, signal lines common to the processing circuits 11 to 13 may be used.

It is assumed here that at least two or more processing circuits in the processing circuits 11 to 13 each have a function to update the power supply control information 101 via the address and data buses BS before outputting a notification signal. Then, the power supply switch control circuit 10 accepts the notification signal outputted from any one of the processing circuits 11 to 13 after the update, and on the basis of the updated power supply control information 101, controls the connection states of respective ones of the respective power supply switch units SW1 to SW3.

Figure 2:
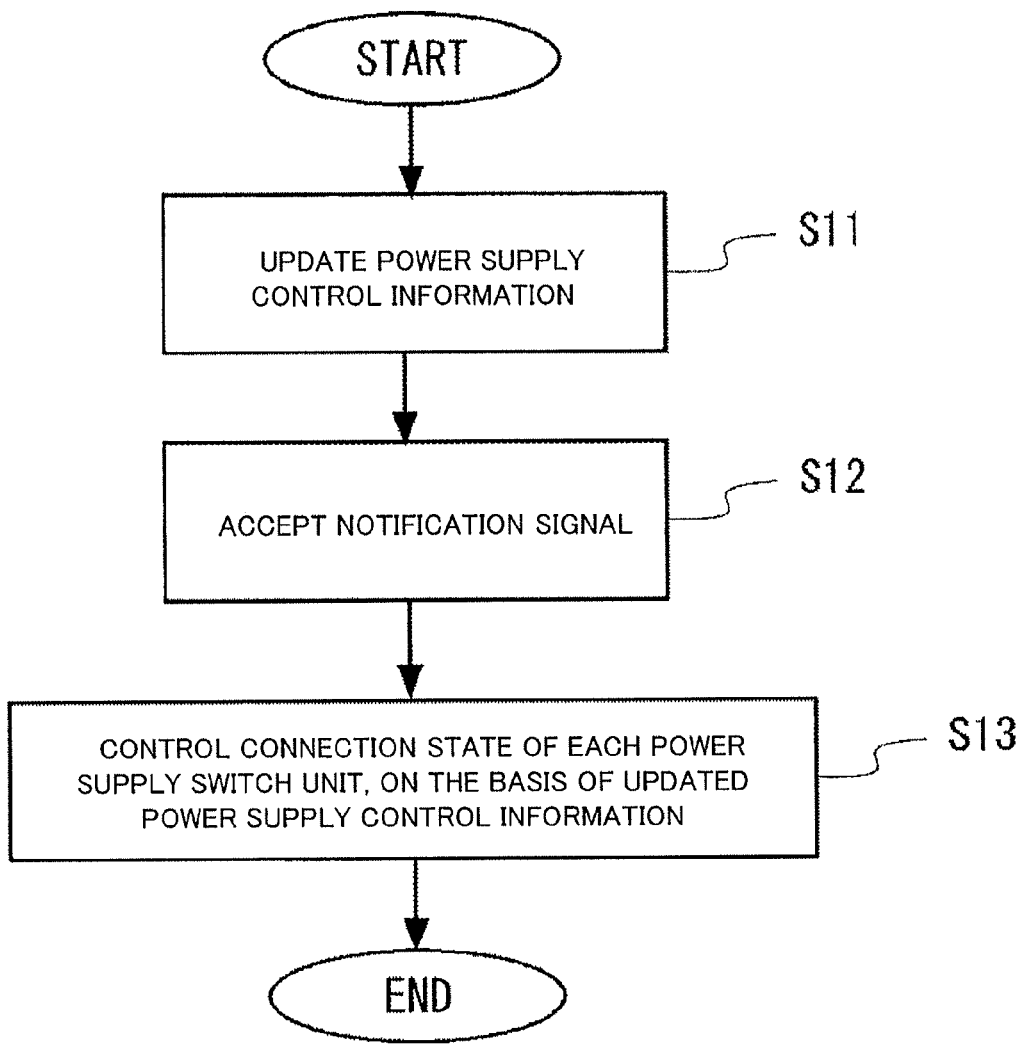
FIG. 2 is a flow chart showing a flow of a power supply control method according to the exemplary embodiment 1 of the present invention.

FIG. 2 is a flow chart showing a flow of a power supply control method according to the exemplary embodiment 1 of the present invention. First, any one of the above-described two or more processing circuits having updating capability updates the information updates the power supply control information 101 via the address and data buses BS, before outputting its own notification signal (S11). That is, any one of the above-described two or more processing circuits having updating capability updates the power supply control information 101 via the address and data buses BS, before turning off either of the power supply switch units SW2 and SW3 which connects the processing circuits with the power supply source Vdd.

Next, the power supply switch control circuit 10 accepts the notification signal outputted from any one of the processing circuits 11 to 13 after the step S11 (S12). Then, on the basis of the updated power supply control information 101, the power supply switch control circuit 10 controls the connection states of respective ones of the power supply switch units SW1 to SW3 (S13). That is, the power supply switch control circuit 10 controls opening/closing of each of the power supply switch units SW1 to SW3.

Thus, in the exemplary embodiment 1 of the present invention, even in a case if a processing circuit is one which is other than a process execution circuit such as a CPU, the processing circuit can update the power supply control information 101 equivalently to the process execution circuit, by performing the update via the address and data buses BS. As a result, even during a time period where power supply to a processing circuit corresponding to the process execution circuit is kept OFF, it is possible to appropriately update the power supply control information 101 and thereby realize a desired change in the connection states. In particular, the exemplary embodiment 1 can be applied also to a case where transitions are made to a plurality of connection states in a predetermined order, in accordance with the processing states of the respective processing circuits, where the order of connection state transitions is to be changed. Accordingly, the flexibility in power supply control can be further increased.

Here, the above-described processing circuits 11 to 13 may include at least a memory circuit and a process execution circuit. The memory circuit is referred to as a circuit block which stores instruction code and data. The process execution circuit is referred to as a circuit block which executes a process according to the instruction code and data stored in the memory circuit. For example, the process execution circuit may be a central processing circuit. The above-described processing circuits having capability of updating the power supply control information via the address and data buses BS may include a processing circuit other than the above-described process execution circuit. For example, when the processing circuit 11 is assumed to be the process execution circuit, it is then assumed that at least either of the processing circuits 12 and 13 can update the power supply control information via the address and data buses BS.

Exemplary Embodiment 2 of the Invention

Figure 3:
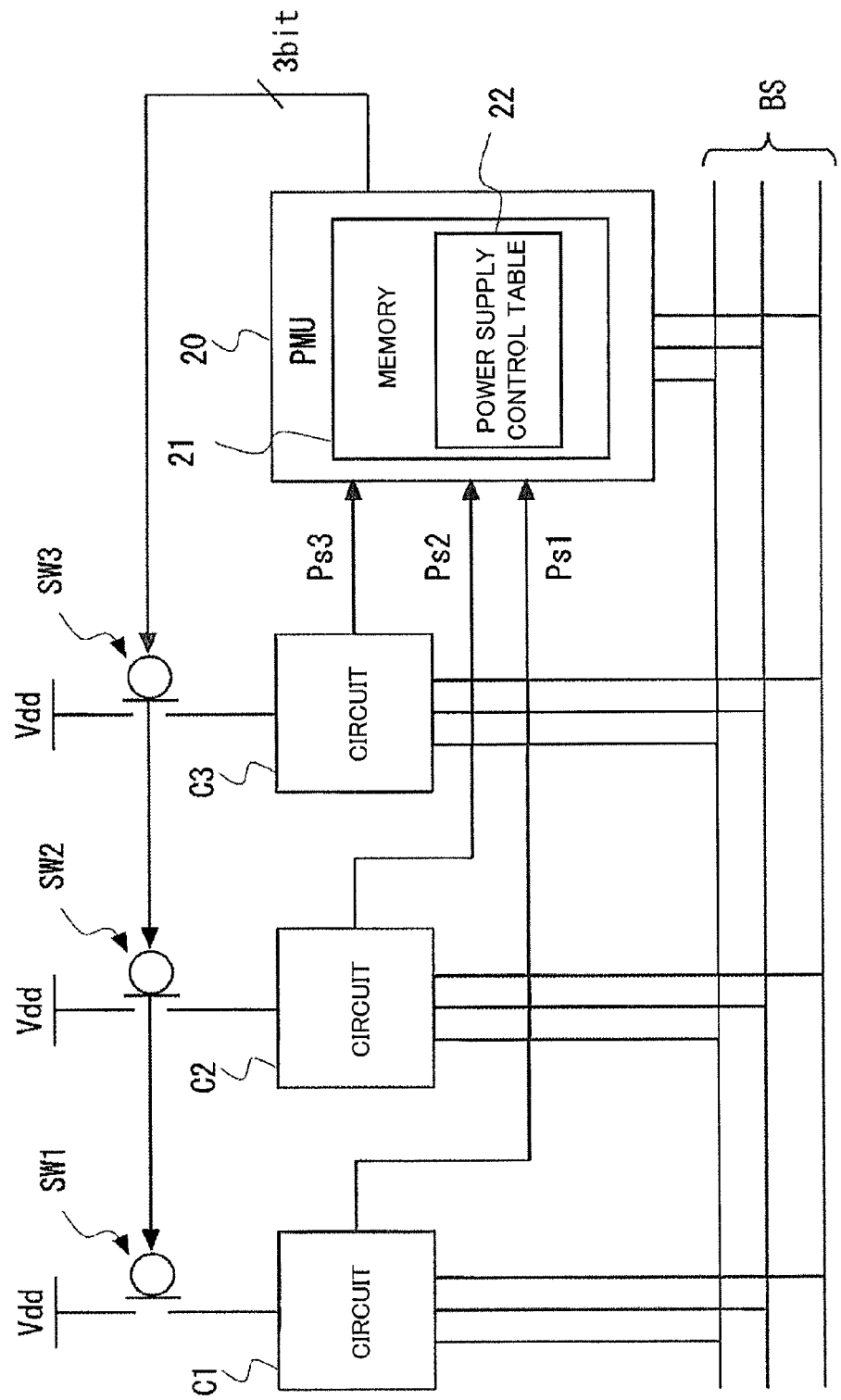
FIG. 3 is a block diagram showing a configuration of a semiconductor integrated circuit according to an exemplary embodiment 2 of the present invention.

An exemplary embodiment 2 of the present invention is a modified example of the exemplary embodiment 1 described above. FIG. 3 is a block diagram showing a configuration of a semiconductor integrated circuit 200 according to the exemplary embodiment 2 of the present invention. Here, while the circuits C1 to C3 are examples of the above-described processing circuits 11 to 13 respectively including the notification units 111, 121 and 131, illustration of the notification units is omitted.

As shown in FIG. 3, from each of the circuits C1 to C3, a signal line for notifying the processing state inside the circuit emerges, and the signal line is then connected to a PMU 20. The PMU 20 is an example of the above-described power supply switch control circuit 10, which comprises a memory 21 for storing a power supply control table 22. The power supply control table 22 is an example of the above-described power supply control information 101, which is information for controlling power supply switches SW1 to SW3 for respective ones of the circuits C1 to C3.

FIG. 4 is a diagram showing a definition of the power supply control table 22 according to the exemplary embodiment 2 of the present invention. The power supply control table 22 is one in which, to each of processing circuits corresponding to the output source of a notification signal, a connection state to be the transition destination (that is, to which the transition is to be made) for each of a plurality of power supply switch units is correlated. Here, FIG. 4 shows a case where connection states of power supply switches SW1 to SWx are correlated to each of notification signals Ps1 to Psx. S(i, j) expresses a control to set a power supply switch SWj to be "ON" or "OFF" which is performed by the PMU 20 on accepting an notification signal Psi in the active state. For example, when the PMU 20 receives a notification signal Ps1, connection states of the respective power supply switches become as in the following Formula (1).

[Equation 1]

$$[Sw1, Sw2, Sw3, \ldots, Swx] = [S(1,1), S(1,2), S(1,3) \ldots, S(1,x)] \quad (1)$$

The description will be continued below, returning back to FIG. 3. In the PMU 20, the power supply control table 22 stored in the memory 21 can be rewritten, that is, updated from any one of the circuits C1 to C3 via the address and data buses BS. In accordance with any one of notification signals Ps1 to Ps3 received from any one of the circuits C1 to C3, the PMU 20 refers to the power supply control table 22 in the memory 21 and accordingly turns on or off the power supply switches for the power supply provided to the circuits C1 to C3.

The circuits C1 to C3 are aggregates of circuits (circuit blocks) which are segmented in terms of function units (function blocks), such as a CPU, a memory, a computing unit, a wired/wireless communication module, a timer module, an analog/digital converter and a direct memory access module (DMA). In the following, the circuits C1 to C3 may be referred to collectively as circuit blocks. Each of the circuit blocks is configured to generate a flag (Ps signal) for notifying completion of a predetermined process in the circuit block. Here, specific examples of the Ps signal will be mentioned below. First, when the corresponding circuit block is a CPU or a memory, the signal is preferably a signal which is outputted when the program counter of the CPU has reached an address at which a code to be executed at the end of a processing program is stored (an end code address). The end code address may be set manually or automatically by a compiler or the like, referring to the content of the program code when the program code is compiled. Alternatively, the signal may be a signal which is outputted when a special instruction for waiting, such as sleep and halt, is invoked. When the corresponding circuit block is a computing unit, the signal is preferably a signal which is outputted when a computation result is written back into a register after inputting data to an operand. When the corresponding circuit block is a communication module, the signal is preferably a signal which is outputted when transmission and reception have been completed. When the corresponding circuit block is a timer module, the signal is preferably an alarm signal at a preset time. When the corresponding circuit block is an analog/digital converter, the signal is preferably a signal which is outputted when a conversion process has been completed or when the conversion buffer is saturated. When the corresponding circuit block is a DMA, the signal is preferably a signal which is outputted when a data transfer process has been completed. Here, examples of the Ps signal are not limited to those ones. The Ps signal may be any notification signal which at least is optionally outputted by a notification unit (not illustrated) installed inside each of the circuit blocks as a result of the notification unit's monitoring the processing state of the own circuit.

A storage element in each of the circuit blocks is a non-volatile storage element using an MRAM (magnetoresistive memory). Accordingly, the internal data is not lost by an OFF action of the corresponding power supply switch. Therefore, it is not necessary to save the data to the outside of the circuit block before the OFF action. Further, if data processed in each of the circuit blocks does not need to be extracted immediately after the processing, the circuit block may be switched into the off state to reduce the standby power, and the processed data may be extracted at only a later time when it becomes necessary by turning on the corresponding power supply switch.

Figure 6:
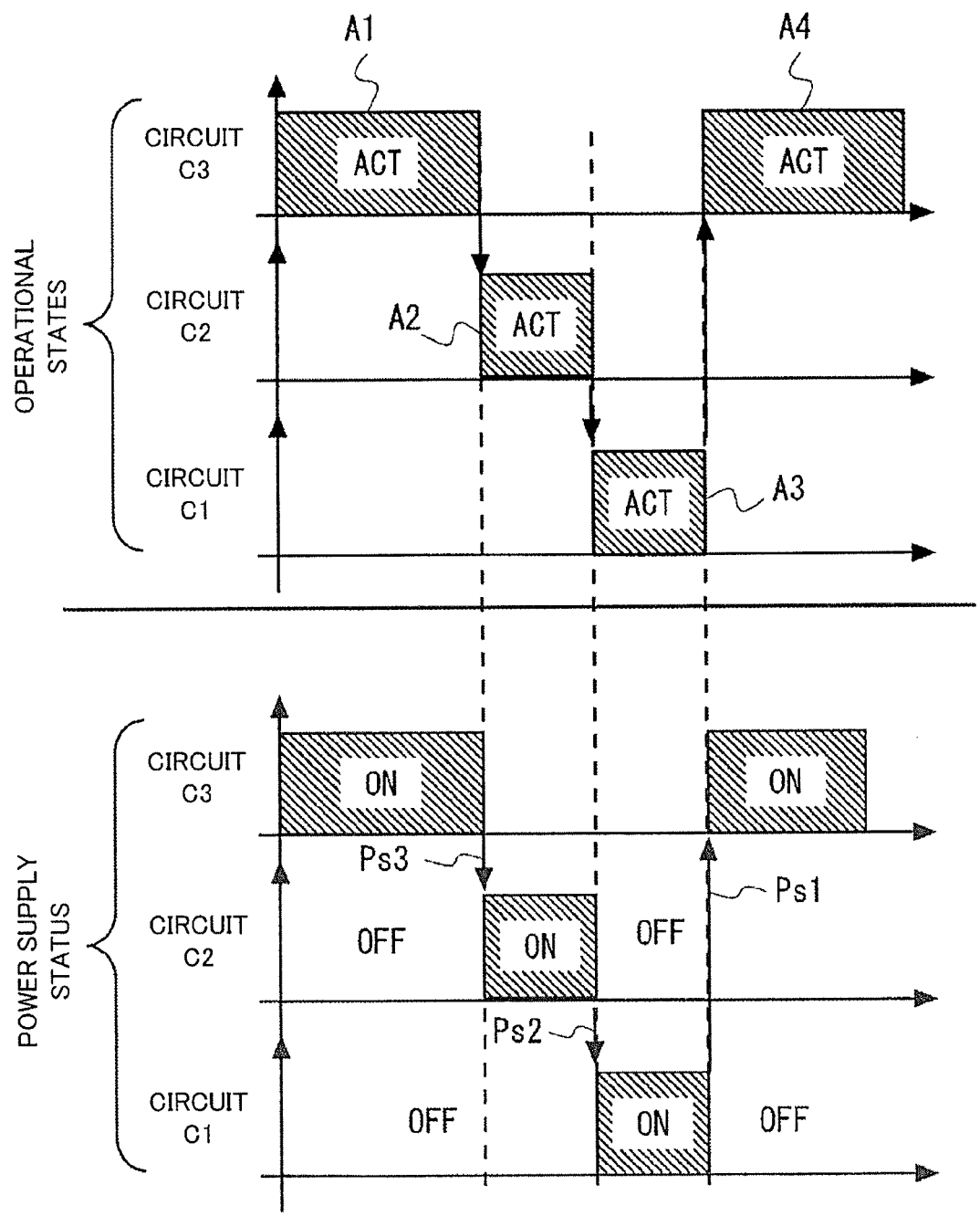
FIG. 6 is a diagram showing an example of operational states of circuit blocks and states of their power supply switches, according to the exemplary embodiment 2 of the present invention.

Hereinafter, a description will be given of an example of operation of the semiconductor integrated circuit 200 according to the present exemplary embodiment 2. First, as a premise, it is assumed that values shown in FIG. 5 are set in the power supply control table 22. FIG. 6 is a diagram showing an example of operational states of the circuit blocks and states of the power supply switches, according to the exemplary embodiment 2 of the present invention. First, it is assumed that, as a procedure A, processes are performed in the order of a process A1 by the circuit C3, a process A2 by the circuit C2, a process A3 by the circuit C1, and then a process A4 by the circuit C3 again (the operational states shown in FIG. 6).

In that case, the circuit C3 outputs the notification signal Ps3 at the end of the process A1. Accordingly, accepting the notification signal Ps3 and then referring to the power supply control table 22, the PMU 20 performs control to switch the power supply switch SW1 to be "OFF", the power supply switch SW2 to be "ON", and the power supply switch SW3 to be "OFF". As a result, the circuit C3 comes not to be provided with power supply, and power saving is thus achieved.

Next, the circuit C2 provided with power supply executes the process A2 and outputs the notification signal Ps2 at the end of the process A2. Accordingly, accepting the notification signal Ps2 and then referring to the power supply control table 22, the PMU 20 performs control to switch the power supply switch SW1 to be "ON", the power supply switch SW2 to be "OFF", and the power supply switch SW3 to be "OFF".

Subsequently, the circuit C1 provided with power supply executes the process A3 and outputs the notification signal Ps1 at the end of the process A3. Accordingly, accepting the notification signal Ps1 and then referring to the power supply control table 22, the PMU 20 performs control to switch the power supply switch SW1 to be "OFF", the power supply switch SW2 to be "OFF", and the power supply switch SW3 to be "ON". As a result, the circuit C3 is provided with power supply again, and accordingly can execute the process A4.

That is, following the power supply control table 22, the PMU 20 causes the power supply status (connection states) of the circuit blocks (C1, C2, C3) to transit to statuses (ON, OFF, OFF), (OFF, ON, OFF), (OFF, OFF, ON) and (ON, OFF, OFF) in this order, in accordance with the operational states of the respective circuit blocks.

Figure 7:
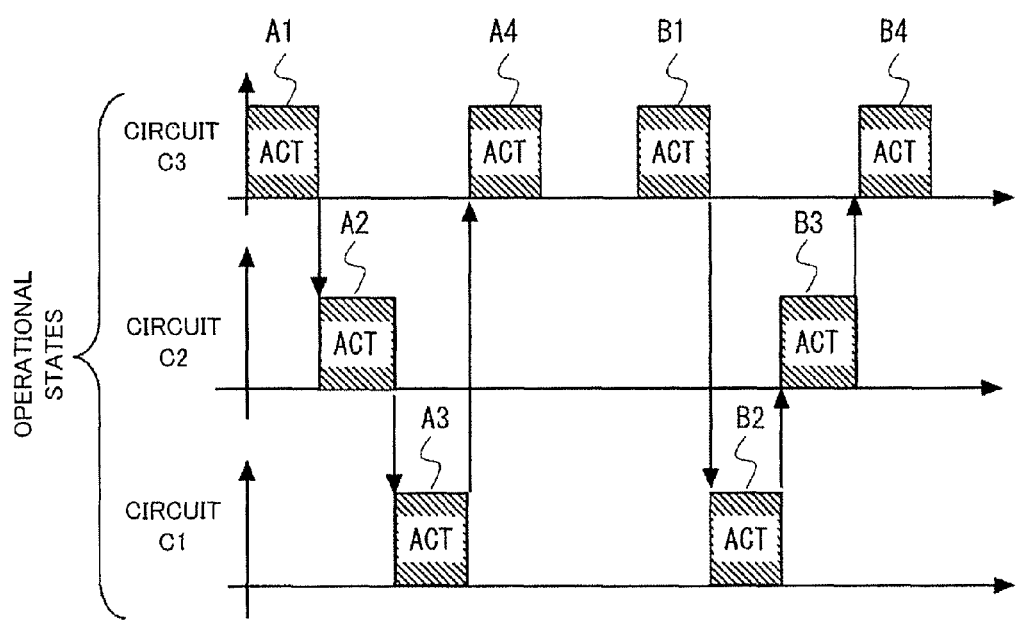
FIG. 7 is a diagram showing an example of a process in which circuit blocks enter into an operational state in a different order, according to the exemplary embodiment 2 of the present invention.
Figure 8:
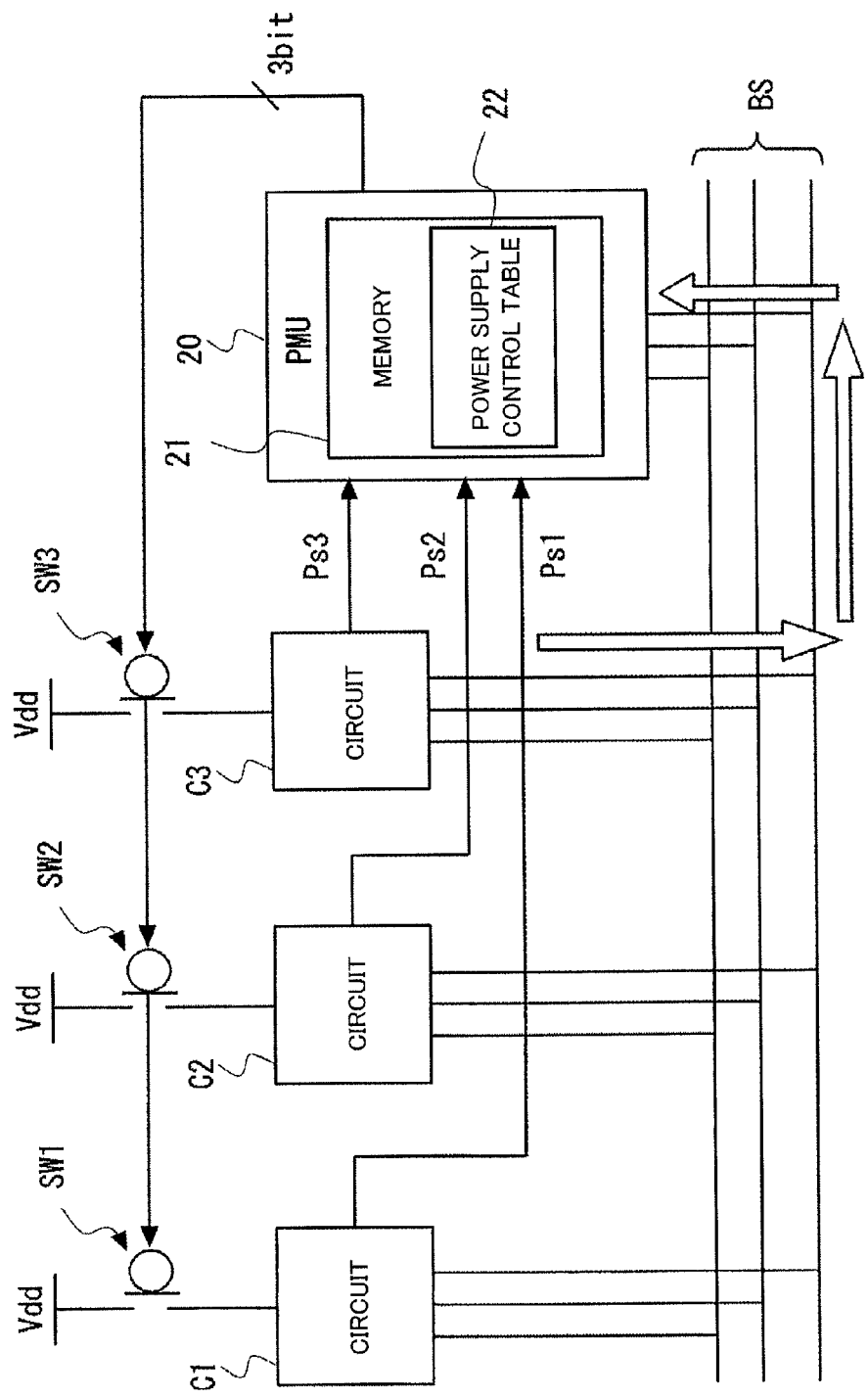
FIG. 8 is a diagram showing a concept of updating the power supply control table by a circuit via address and data buses, according to the exemplary embodiment 2 of the present invention.
Figure 9:
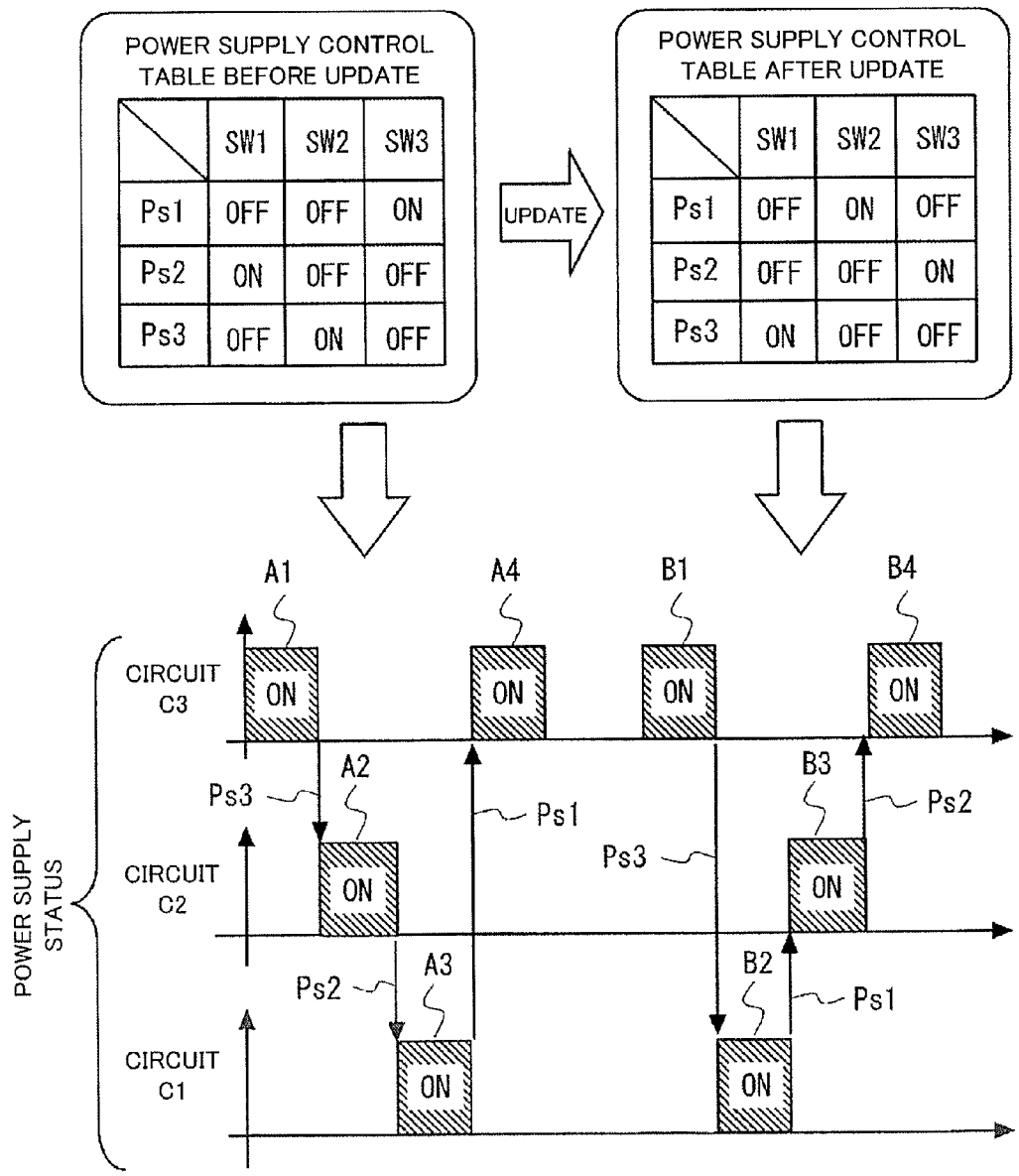
FIG. 9 is a diagram showing a concept of power supply statuses before and after updating the power supply control table, according to the exemplary embodiment 2 of the present invention.

Next, a description will be given of a case where the order of circuit blocks entering into an operational state is changed. FIG. 7 is a diagram showing an example of a procedure having a different order of circuit blocks entering into an operational state, according to the exemplary embodiment 2 of the present invention. Here, it is assumed that, as a procedure B subsequent to the sequential procedure A, processes are performed in the order of a process B1 by the circuit C3, a process B2 by the circuit C1, a process B3 by the circuit C2, and then a process B4 by the circuit C3 again. For the procedure B, ideal power supply statuses of the circuit blocks (C3, C2, C1) are (ON, OFF, OFF), (OFF, OFF, ON), (OFF, ON, OFF) and (ON, OFF, OFF) in this order. Accordingly, for example, if the process A4 and the process B1 are executed simultaneously or sequentially, the circuit C3 updates the power supply control table 22 via the address and a data buses BS during its executing the processes A4 and B1. That is, the circuit C3 performs update for causing the connection states of the power supply switches SW1 to SW3 to transit in a manner to realize the procedure B. FIG. 8 is a diagram showing a concept of updating the power supply control table 22 by the circuit C3 via the data and address buses, according to the exemplary embodiment 2 of the present invention. FIG. 9 is a diagram showing a concept of power supply statuses before and after an update of the power supply control table 22, according to the exemplary embodiment 2 of the present invention. That is, by rewriting the power supply control table 22 in advance during operation of the circuit C3, it becomes possible to flexibly deal with a case of having a change between the procedure A and the procedure B not only in timings of the output signals (Ps1, Ps2, Ps3) from the circuit blocks (C1, C2, C3) but also in circuit blocks to be targets of power supply switching or in their switching order.

As has been described above, even when the order of connection state transitions is different between different sets of processes, by rewriting the power supply control table 22 in the PMU 20 from an optional one of the circuit blocks via the address and data buses BS, power supply (to each of the circuit blocks) can be switched OFF or ON, on the basis of a signal for detecting a processing action received from the own or another one of the circuit blocks. Further, by updating the power supply control table 22 in advance during operation of the circuit blocks, which are a CPU or other than a CPU, a power supply switch status (connection states) suitable for power saving can be maintained even when a circuit block having made the rewriting has entered into the OFF state after the update.

Exemplary Embodiment 3 of the Invention

An exemplary embodiment 3 of the present invention is a modified example of the exemplary embodiments 1 or 2 described above. A power supply switch control circuit according to the exemplary embodiment 3 of the present invention further stores a mask bit for defining a processing circuit whose notification signal is invalidated, among a plurality of processing circuits. Then, even if receiving a notification signal from the processing circuit whose notification signal has been invalidated by the mask bit, the power supply switch control circuit does not change its control of a plurality of power supply switch units. Thus, by appropriately changing the set value of the mask bit, a notification signal from some of the plurality of processing circuits can be invalidated, and accordingly, the power supply control can be performed flexibly. For example, update of the mask bit may be made to the power supply switch control circuit from the outside. Alternatively, each of the processing circuits may update the mask bit via address and data buses BS. Here, because the configuration of the semiconductor integrated circuit according to the exemplary embodiment 3 of the present invention is equivalent to the above-described one, its illustration and detailed description will be omitted.

Exemplary Embodiment 4 of the Invention

An exemplary embodiment 4 of the present invention is a modified example of the exemplary embodiment 1 described above. Each time receiving a notification signal, a power supply switch control circuit according to the exemplary embodiment 4 of the present invention determines, in accordance with the current connection states of a plurality of power supply switch units, their connection states to be the transition destination, and then controls the plurality of power supply switch units to transit to respective ones of the determined connection states. Accordingly, taking reception of a notification signal as a trigger, the connection states can be made to transit in a predetermined order. Further, by appropriately updating the power supply control information as already described above, more flexible power control can be realized. Here, because the configuration of the semiconductor integrated circuit according to the exemplary embodiment 4 of the present invention is equivalent to the above-described one, its illustration and detailed description will be omitted.

It is desirable that, in the power supply control information, to each set of connection states of the plurality of power supply switch units before transition, a plurality of sets of connection states capable of being a transition destination are correlated in advance. Then, it is desirable that, each time receiving a notification signal, by then regarding the current connection states as the connection states before transition, the power supply switch control circuit determines, from the power supply control information, any one of the plurality of sets of connection states capable of being a transition destination to be the connection states to be the transition destination (that is, to which the transition is to be made), and then controls the plurality of power supply switch units to transit to respective ones of the determined connection states.

It is further desirable that the power supply control information is correlated with each of the plurality of sets of connection states capable of being a transition destination, and with a plurality of pieces of pattern information each specifying a group of sets of connection states in which the plurality of sets of connection states are included. Here, in the exemplary embodiment 4 of the present invention, it is assumed that, as the pattern information, a transition destination pattern t, which represents a set of transition destinations for when making the connection states of the power supply switches transit, is used. Then, it is desirable that, on the basis of the current connection states and a predesignated one of the plurality of pieces of pattern information, the power supply switch control circuit determines connection states to be the transition destination, from the power supply control information. That is, it is assumed that one of the plurality of pieces of pattern information is designated in advance from the outside of the semiconductor integrated circuit 200 or from the processing circuits. It is also preferable that each of the plurality of processing circuits updates the pattern information designation via address and data buses. In that way, the order of connection state transitions can be changed at an optional timing from the processing circuits, and accordingly, more flexible power control can be performed.

It is further assumed that the power supply switch control circuit according to the exemplary embodiment 4 of the present invention holds a mask bit Mb(i, t) in advance. Here, Mb(i, t) is defined as a value which indicates whether a notification signal Psi is set to be valid ("1") or invalid ("0") with respect to the transition destination pattern t. In that case, the power supply switch control circuit can express a plurality of notification signals by one notification signal Ps[t] using the following Formula (2). That is equivalent to making the notification signal Ps have a logic. Then, the power supply switch control circuit may be configured to determine connection states to be the transition destination in accordance with the notification signal Ps[t].

[Equation 2]

$$Ps[t] = (Ps1 \cap Mb(1,t)) \cup (Ps2 \cap Mb(2,t)) \cup \ldots \cup (Ps2 \cap Mb(x,t)) \quad (2)$$

Here, it is assumed that t=1, 2, . . . , t_max, and that x equals to the number of kinds of notification signals (the number of processing circuits).

What described just above may be expressed also as follows. That is, on the basis of a processing circuit having outputted a notification signal and a designated piece of pattern information, the power supply switch control circuit converts notification signals outputted from the respective processing circuits into a predetermined notification signal, and controls the connection states on the basis of the converted notification signal and the power supply control information.

Further, a set of connection states of the respective power supply switches is defined as a power supply status y (=1 to z). FIG. 10 is a diagram showing examples of the power supply status according to the exemplary embodiment 4 of the present invention. Then, a current power supply status (set of connection states before transition) y=c is correlated with a next power supply status (set of connection states capable of being a transition destination) y_next(c, t). FIG. 11 is a diagram showing an example of correlating power supply statuses before transition with those after transition, according to the exemplary embodiment 4 of the present invention. Here, y_next(c, t) represents one set of connection states to be the transition destination which is specified by a set of connection states before transition, c, and a designated transition destination, t. Accordingly, from the current connection states of the respective power supply switches and the notification signal Ps[t], the power supply switch control circuit can determine a set of connection states to be the transition destination.

Accordingly, accepting a notification signal Psx from any one of the processing circuits, and then converting it into Ps[t], the power supply switch control circuit causes connection states of the respective power supply switches to transit from those of the current power supply status c to those of the next power supply status y_next(c, t). That is, the connection states thus determined to be the transition destination can be expressed by the following Formula (3).

[Equation 3]

$$[SW1, SW2, SW3, \ldots, SWx] = [S(y\_next(c,t),1), S(y\_next(c,t),2), S(y\_next(c,t),3), \ldots, S(y\_next(c,t),x)] \quad (3)$$

Figure 12:
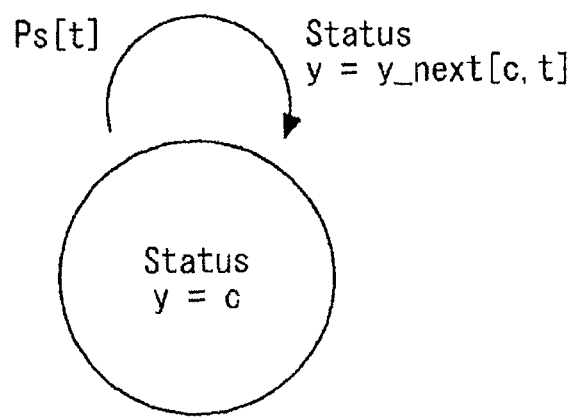
FIG. 12 is a diagram showing an example of a state transition diagram of power supply status according to the exemplary embodiment 4 of the present invention.

Based on the above-described configuration, an example of a state transition diagram of power supply status according to the exemplary embodiment 4 of the present invention is shown in FIG. 12.

Further, the current power supply status, Status(c), is enabled to be controlled even during a time period when a circuit block such as a CPU is in operation, by external input or via the data and address buses. Accordingly, during a time period when the CPU is executing a program, a specific circuit block can be switched into the ON state as necessary, and thereby, reading of processed data or writing of data desired to be processed can be performed. That operation can be similarly realized even by a processing circuit other than a CPU via the data and address buses.

Here, because Ps[t] can be programmed by the mask bit Mb and more than one next power supply statuses can be designated, it is possible to repeat a power supply status on a certain cycle or to change the status to a different one during the repetition. Accordingly, even in a case of a complicated process including a loop process or a conditional branching where a circuit block in operation is changed in a complicated manner, it is possible to construct an optimum power supply switch control sequence.

Exemplary Embodiment 5 of the Invention

Figure 13:
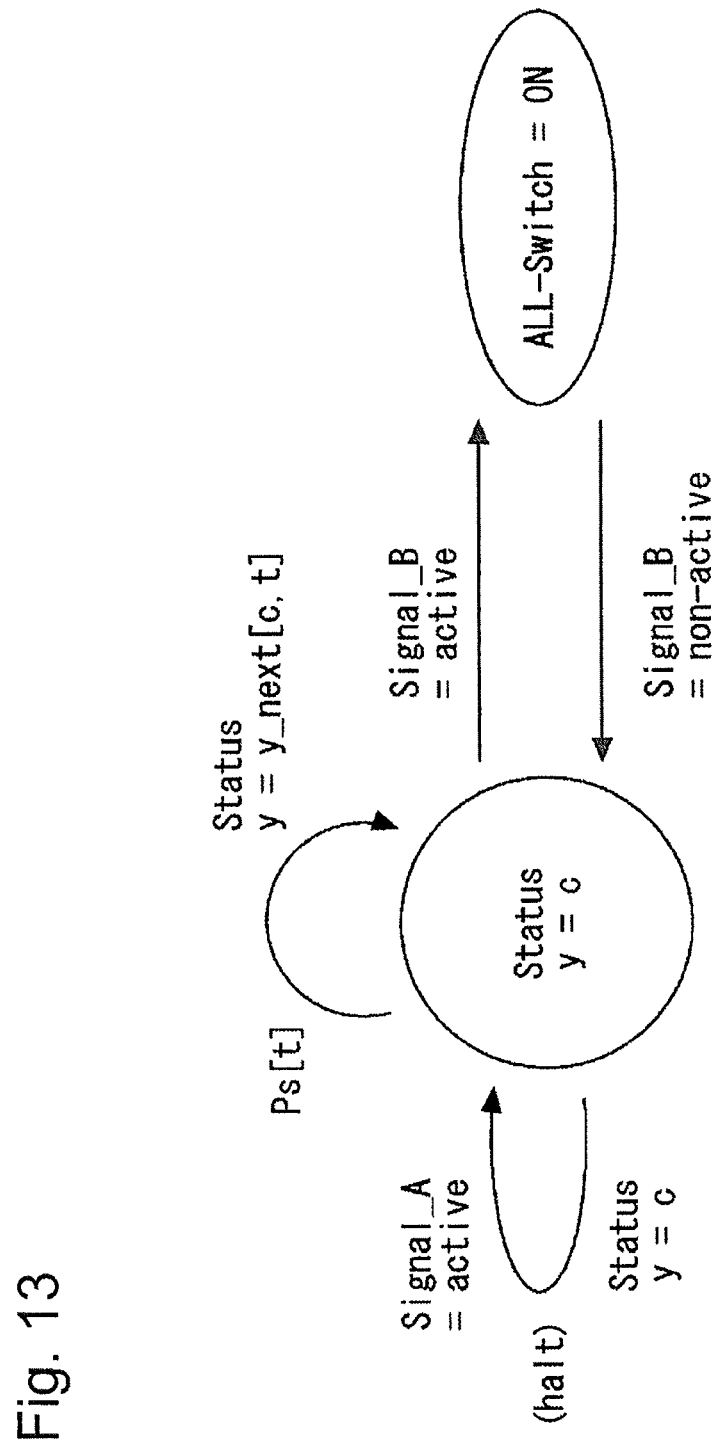
FIG. 13 is a diagram showing an example of a state transition diagram of power supply status including external input, according to an exemplary embodiment 5 of the present invention.
Figure 14:
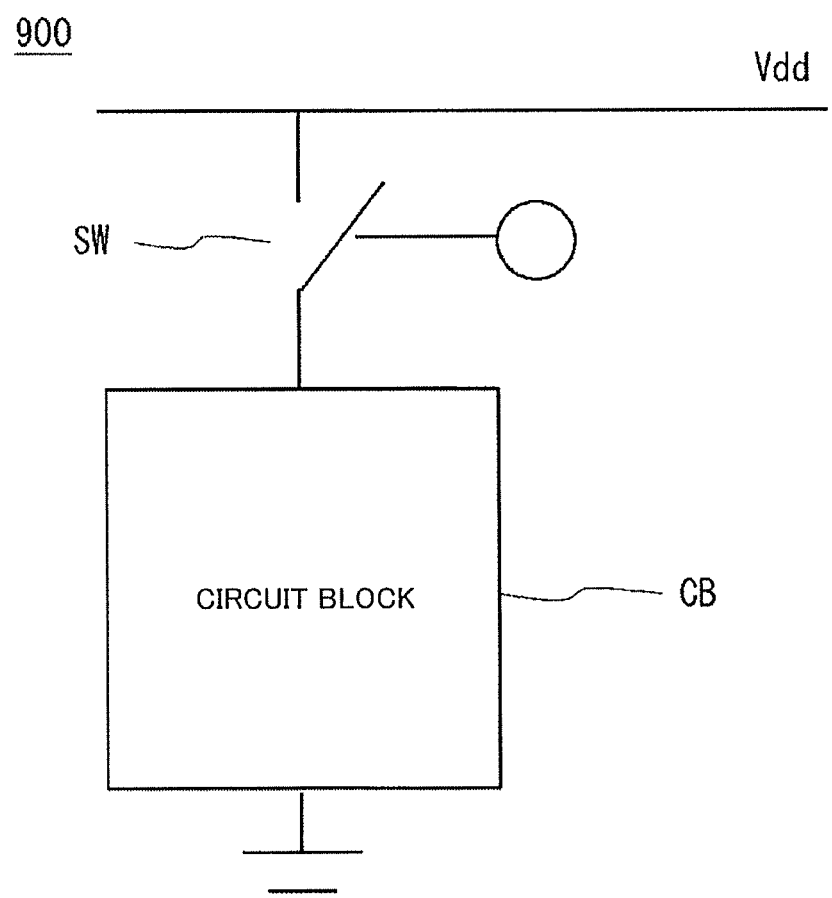
FIG. 14 is a diagram showing an example of power supply switch installed at a circuit block according to a related art.
Figure 15:
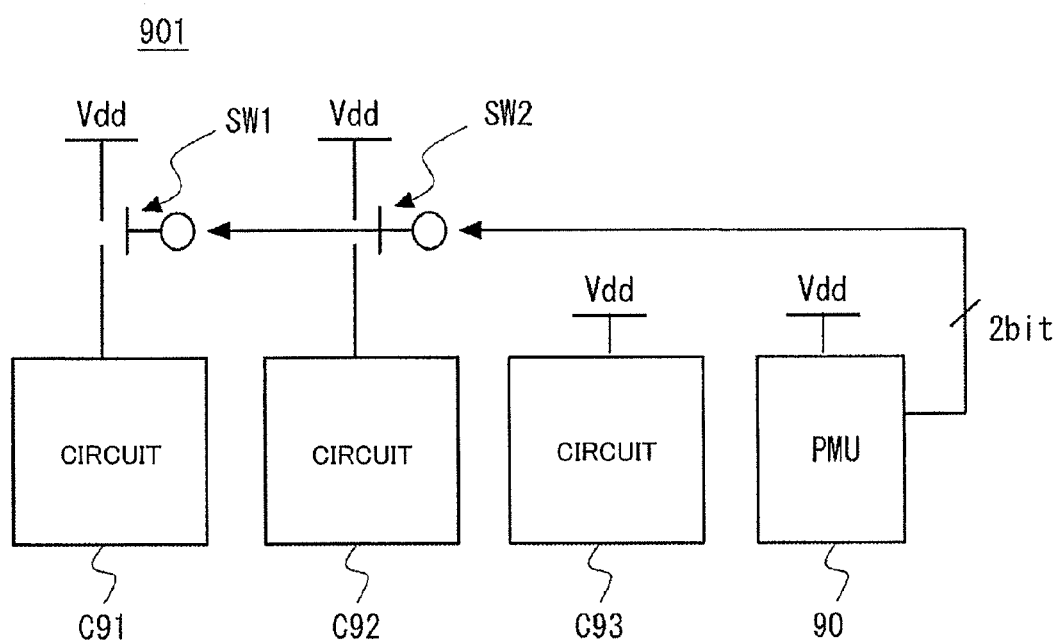
FIG. 15 is a block diagram schematically showing a configuration of a semiconductor integrated circuit according to a related art.
Figure 16:
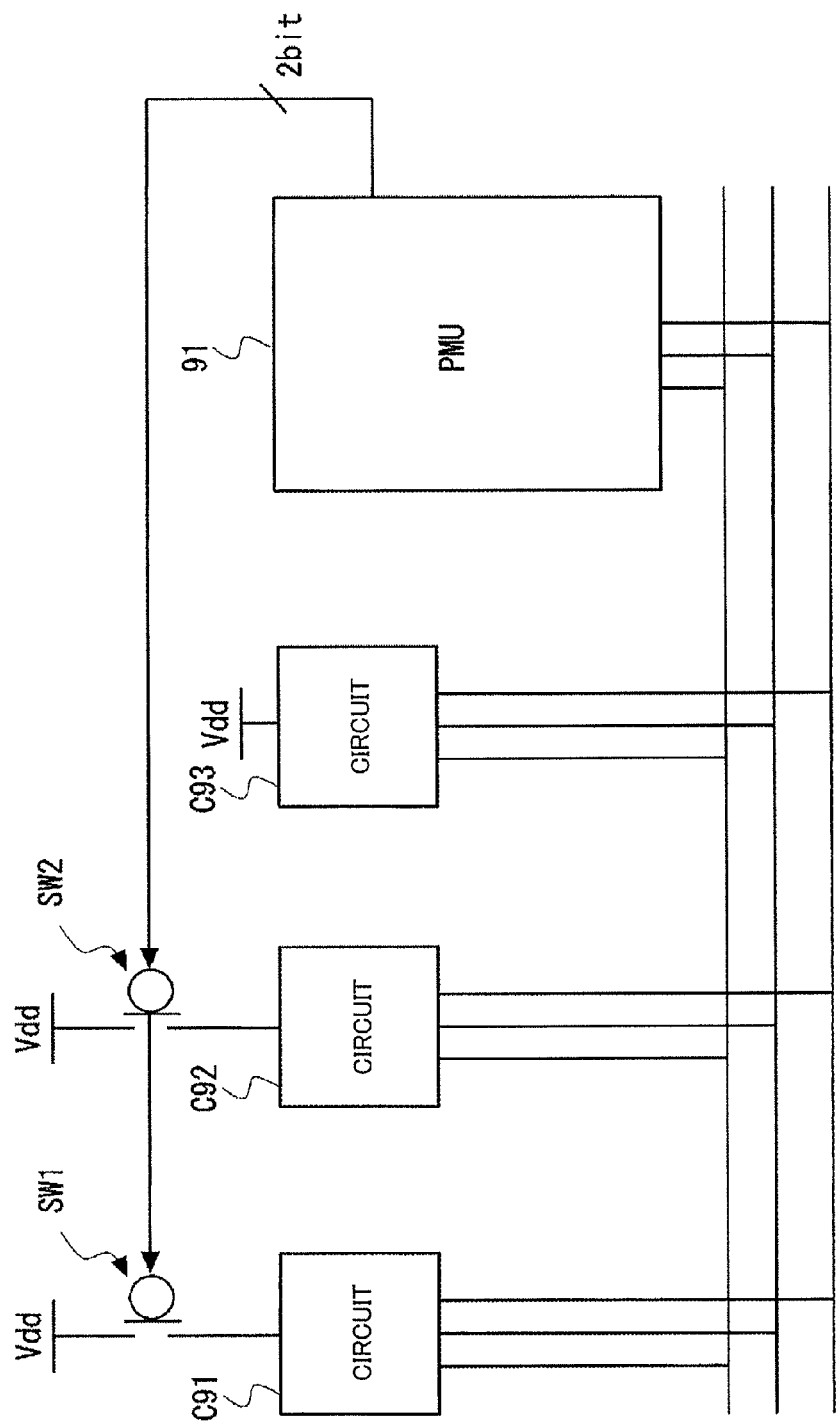
FIG. 16 is a block diagram schematically showing a configuration of a semiconductor integrated circuit according to a related art.
Figure 17:
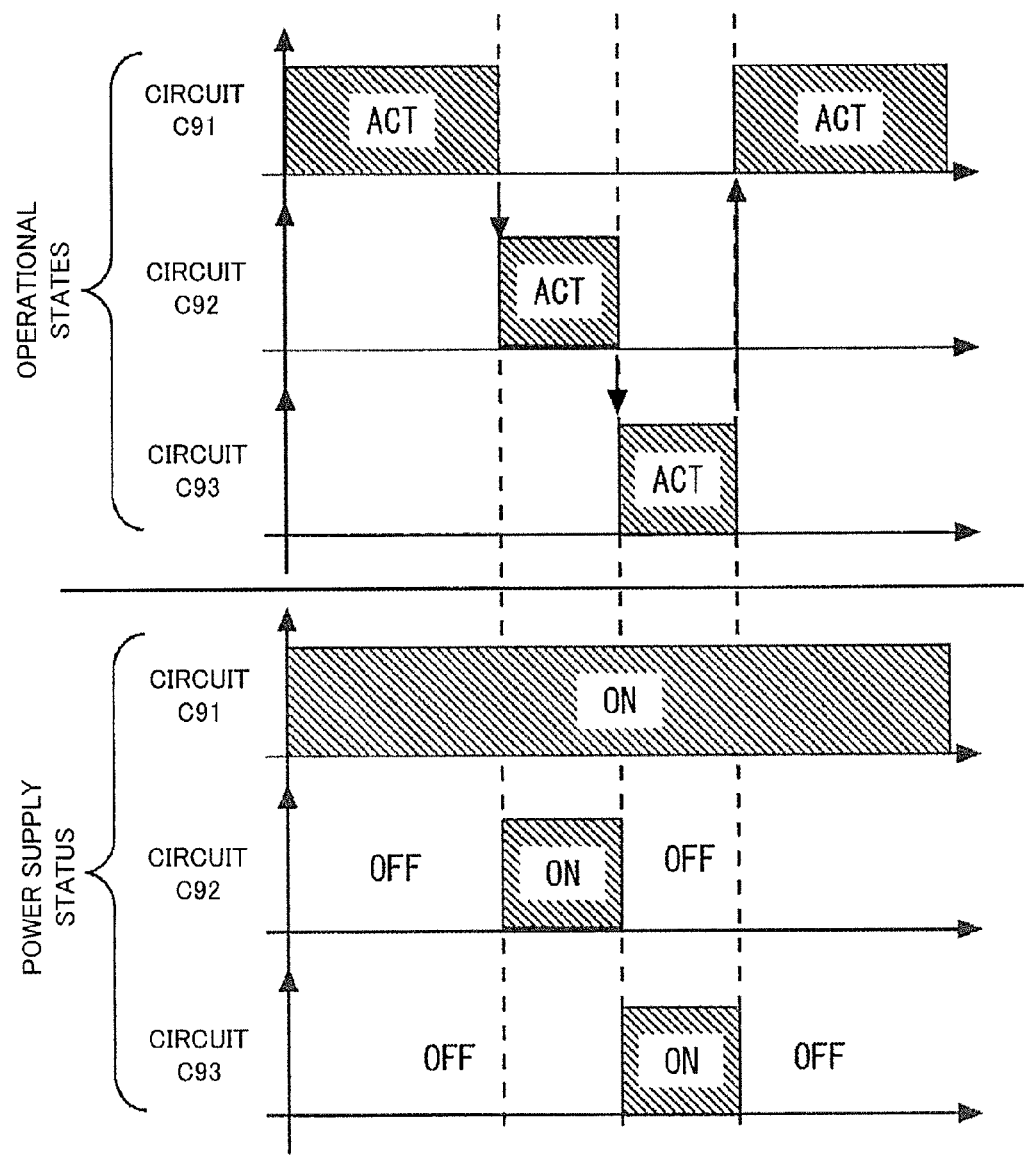
FIG. 17 is a diagram showing an example of operational states of circuit blocks and states of their power supply switches, according to the related arts.

An exemplary embodiment 5 of the present invention is a modified example of the exemplary embodiment 4 described above. FIG. 13 is a diagram showing an example of a state transition diagram of power supply status including external input, according to the exemplary embodiment 5 of the present invention.

In the exemplary embodiment 5 of the present invention, as a measure against an error in power supply control of a semiconductor integrated circuit, control signals A and B by external input are additionally used besides the notification signals. Here, when the control signal A is in the active state, the current states of the power supply switches are maintained even if any monitoring signal i inside a processing circuit is generated. That is, a power supply switch control circuit has a connection unit for a first control signal (the control signal A) from the outside and, when the first control signal is in the active state, does not cause the connection states of respective ones of the plurality of power supply switch units to transit even if receiving a notification signal from any one of the plurality of processing circuits. For example, in a case such as that where specifying a transition of the connection states is difficult because of an error, the connection states of the power supply switches are fixed by setting the control signal A in the active state from the outside of the semiconductor integrated circuit. As a result, error analysis or the like can be performed efficiently.

On the other hand, when the control signal B becomes in the active state, all of the power supply switches are turned on. That is, the power supply switch control circuit has a connection unit for a second control signal (the control signal B) from the outside and, when the second control signal is in the active state, controls all of the plurality of power supply switch units to be connected with the power supply source. By thus making it possible to forcedly designate a power supply switch status, Status(c), it becomes possible to easily escape (recover) even if an unexpected error occurs during processing and there accordingly occurs falling into uncertainty of the power supply switch status, Status (c), or into an infinite processing loop state as a result of the uncertainty.

Other Exemplary Embodiments of the Invention

The present invention can be expressed as a semiconductor integrated circuit including power supply switches and their control circuit, and as an operation method for the semiconductor integrated circuit. Then, the present invention may embrace ones relating to a semiconductor integrated circuit including power supply switches for power supply control which are installed at respective function blocks and a control circuit for controlling the power supply switches, and ones relating to an operation method for the semiconductor integrated circuit.

In operation of a system consisting of a plurality of circuit blocks each having a power supply switch, it was impossible, in some case of the content of the system's processing, to turn off the power supply switch of a circuit block having no processing operation to perform, there accordingly was no choice but to leave the power supply switch in the ON state, and as a result, there occurred standby power loss. Accordingly, it was necessary to further improve controllability of the power supply switches.

In this respect, at least the following one is mentioned as another exemplary embodiment of the present invention. First, signals for monitoring the processing operation states of respective circuit blocks are connected to a circuit for controlling power supply switches (PMU). The PMU has a memory which stores information for controlling the power supply switches of the respective circuit blocks (a switch control table), where the switch control table is enabled to be optionally rewritten from another circuit block via data and address buses. Taking a monitoring signal from each of the circuit blocks as a trigger, the PMU refers to the switch control table in the memory and accordingly switches the power supply switches.

As a result, the following advantage also is achieved. That is, even a circuit block capable of rewriting the switch control table in the PMU can be turned off when it is not in use, on the basis of a monitoring signal from the circuit block itself or from another circuit block. Further, by updating the switch control table from a circuit block in operation via the data and address buses before performing a process having a different order of switching the power supply switches, a power supply switch status suitable for power saving can be maintained even in a processing operation after the circuit block becomes in the OFF state.

More specifically, the following one is mentioned as another exemplary embodiment of the present invention. That is, the exemplary embodiment is characterized by that it is a semiconductor integrated circuit including at least: processing circuits each including a monitoring unit for monitoring the processing operation state of the own processing circuit; power supply switches for the processing circuits; a power supply switch control circuit (PMU) including a connection unit for connecting with the monitoring units and a storage unit for holding power supply switch control information about each of the processing circuits; and data and address buses common to the processing circuits, wherein the power supply switch control circuit switches the power supply switches connected to the respective processing circuits, in accordance with a monitoring signal from the monitoring units of the respective processing circuits and the information held by the storage unit which has been updated in advance via the data and address buses.

Here, the number of processing circuits each including a monitoring unit for monitoring the processing operation state of the own processing circuit may be more than one. One of the plurality of processing circuits may be a nonvolatile memory circuit, and another one of the processing circuits may be a central processing circuit which executes a process according to instruction code and data stored in the nonvolatile memory circuit. In that case, before the power supply control switch connected to the central processing circuit is turned off, the central processing circuit rewrites the power supply control information according to the instruction code and data stored in the nonvolatile memory circuit. Accordingly, an optimum power supply switch status can be maintained even after processing circuits including a central processing unit capable of rewriting the power supply control information become in the off state.

As the power supply switch control information, in addition to a plurality of switch statuses represented by Status(y) (y=1, 2, ..., y_max), the storage unit stores information on the next switch status y_next(c, i) which depends on the current switch status Status(c) and a monitoring signal i from the processing circuits. Taking a change in the monitoring signal i from the processing circuits as a trigger, transition is made to the next power supply switch status, Status(y_next (c, i)). Because the storage unit has addresses on the memory map, reading from and writing into it can be performed by optionally accessing it via the address and data buses. It is more desirable that the current power supply switch status, Status(c), is enabled to be controlled by external input or via the data and address buses even during a time period when a circuit block such as the central processing unit is in operation.

In order to give selectivity with respect to the monitoring signal i, which is to be a trigger to change the power supply switch status, a mask bit Mb(i) for inactivating the monitoring signal i inside a processing circuit. Accordingly, it becomes possible to give flexibility such as of disabling transition to the next power supply switch status even when the monitoring signal i inside a processing circuit is generated, by setting the mask bit Mb(i) in the active state.

If there is a restriction on the installation area or the like and simplicity as a circuit is a priority matter, power supply switch control information Ds(i, j) is stored in the storage unit in a manner of labelling it by only the monitoring signal i from the inside of each of the processing circuits and by each of the power supply switches j. When a signal is received from a monitoring signal k inside a processing circuit, the power supply switches are switched on the basis of power supply information Ds(k, j). Accordingly, the circuits can be made simple because of no necessity of considering the status of power supply switches at reception of the monitoring signal.

Further, the configuration may be such that a control signal A different from the monitoring signals from the processing circuits is connected to the power supply switch control circuit, and when the control signal A is in the active state, transition to the next power supply switch status is not made even if any monitoring signal i is generated. The configuration may also be such that a control signal B is further connected, and when the control signal B becomes in the active state, all of the power supply switches are unconditionally turned on. By thus enabling to forcedly set the power supply switch status, Status(c), to be a predetermined one, it becomes easy to recover when an unexpected error occurs during processing and there accordingly occurs falling into uncertainty of the power supply switch status, Status(c), or an infinite processing loop state due to the uncertainty.

Further, when a processing circuit with a power supply switch connected to it has a memory element, it is desirable that the memory element is not a volatile one, such as an SRAM and a DRAM, which needs saving out of data to the outside before an OFF action, but is a nonvolatile one such as a Flash, an ReRAM (resistance change type memory), an FeRAM (ferroelectric memory) and an MRAM (magnetoresistive memory), and accordingly, data inside the processing circuit is not lost by an OFF action of the power supply switch.

According to the present exemplary embodiment, even a circuit block capable of rewriting the power supply switch control information in the PMU can be turned off when it is not in use, on the basis of a processing operation monitoring signal from the circuit block itself or from another circuit block. Further, by updating the power supply switch control information from a circuit block in operation via the data and address buses before performing a process having a different order of switching the power supply switches, a power supply switch status suitable for power saving can be maintained even in a processing action after the circuit block enters into the OFF state.

The present invention is not limited to the above-described exemplary embodiments, and may be appropriately modified within a range not departing from the spirit of the present invention. Part or the whole of the above-described exemplary embodiments can be described as, but not limited to, the following supplementary notes.

(Supplementary Note A1)

A semiconductor integrated circuit characterized by that it includes at least: processing circuits each including a monitoring unit for monitoring the processing operation state of the own processing circuit; power supply switches for the processing circuits; a power supply switch control circuit including a connection unit for connecting with the monitoring units and a storage unit for holding power supply switch control information about each of the processing circuits; and data and address buses common to the processing circuits, wherein the power supply switch control circuit switches the power supply switches connected to the respective processing circuits in accordance with a monitoring signal from the monitoring units of the respective processing circuits and the information held by the storage unit which has been updated in advance via the data and address buses.

(Supplementary Note A2)

The semiconductor integrated circuit according to supplementary note A1, which is characterized by that the number of processing circuits each including a monitoring unit for monitoring the processing operation state of the own processing circuit is more than one.

(Supplementary Note A3)

The semiconductor integrated circuit according to supplementary note A2, which is characterized by that one of the plurality of processing circuits is a nonvolatile memory circuit, and another one of the processing circuits is a central processing circuit which executes a process according to instruction code and data stored in the nonvolatile memory circuit.

(Supplementary Note A4)

The semiconductor integrated circuit according to supplementary notes A1 to A3, which is characterized by that: the storage unit stores information on a plurality of power supply switch statuses and information on next power supply switch statuses depending on the current power supply switch status and signals from the monitoring units inside the respective processing circuits; and transition is made to one of the next power supply switch statuses in response to a signal from the monitoring units of the respective processing circuits.

(Supplementary Note A5)

The semiconductor integrated circuit according to supplementary notes A1 to A4, wherein the current power supply switch status can be changed by external input or via the data and address buses.

(Supplementary Note A6)

The semiconductor integrated circuit according to supplementary notes A1 to A5, which is characterized by that: each piece of power supply switch control information is stored in the storage unit in a manner to be labelled by a signal from the monitoring unit inside a processing circuit and by a power supply switch; and when the monitoring signal inside the processing circuit becomes in the active state, the power supply switch control information is read according to the labelling, and the power supply switch is thereby switched.

(Supplementary Note A7)

The semiconductor integrated circuit according to supplementary notes A1 to A6, which is characterized by that: it has a mask bit for inactivating a signal from the monitoring unit of a processing circuit; and by setting the mask bit in the active state, transition to the next power supply switch status is not made even if the signal from the monitoring unit changes.

(Supplementary Note A8)

The semiconductor integrated circuit according to supplementary notes A1 to A7, which is characterized by that; the power supply switch control circuit has a connection unit for connecting with a control signal A besides that for connecting with signals from the monitoring units; and when the control signal A is in the active state, transition to the next power supply switch status is not made even if a signal from any of the monitoring units is generated.

(Supplementary Note A9)

The semiconductor integrated circuit according to supplementary notes A1 to A8, which is characterized by that; the power supply switch control circuit has a connection unit for a control signal B besides that for connecting with signals from the monitoring units; and when the second control signal B becomes in the active state, all of the power supply switches are turned on.

(Supplementary Note A10)

A control method of the semiconductor integrated circuit according to supplementary notes A3 to A9, which is characterized by that, before a power supply control switch connected to the central processing unit is turned off, the central processing unit rewrites the power supply switch control information in the power supply switch control circuit in accordance with instruction code and data stored in a nonvolatile memory circuit.

Alternatively, part or the whole of the above-described exemplary embodiments can be described as, but not limited to, the following supplementary notes.

(Supplementary Note 1)

A semiconductor integrated circuit characterized by that it comprises:

a plurality of processing circuits each including a notification unit for outputting a notification signal according to the processing state of the own processing circuit;

a plurality of power supply switch units for switching the connection states, which each are either a connected or a disconnected state, between respective ones of the plurality of processing circuits and a power supply source;

a power supply switch control circuit which is connected with the notification units included in respective ones of the plurality of processing circuits, stores power supply control information including the connection states of respective ones of the power supply switch units, and controls the connection states on the basis of the notification signals and the power supply control information; and data and address buses which connect each of the plurality of processing circuits with the power supply switch control circuit, wherein:

at least two or more of the plurality of processing circuits update the power supply control information via the data and address buses before outputting the notification signal; and the power supply switch control circuit accepts a notification signal outputted from any one of the plurality of processing circuits after the update, and accordingly controls the connection states of respective ones of the plurality of power supply switch units on the basis of the updated power supply control information.

(Supplementary Note 2)

The semiconductor integrated circuit according to supplementary note 1, which is characterized by that:

the plurality of processing circuits include at least a memory circuit storing instruction code and data, and a process execution circuit for executing a process on the basis of the instruction code and data stored in the memory circuit; and the at least two or more processing circuits include a processing circuit other than the process execution circuit.

(Supplementary Note 3)

The semiconductor integrated circuit according to supplementary note 1 or 2, which is characterized by that the power supply switch control circuit, each time accepting the notification signal, in accordance with the current connection status of the plurality of power supply switch units, (which is equivalent to a set of their individual current connection states,) determines a connection status to be a transition destination, and accordingly controls each of the plurality of power supply switch units to transit to the determined connection status.

(Supplementary Note 4)

The semiconductor integrated circuit according to supplementary note 3, which is characterized by that:

in the power supply control information, a plurality of connection statuses capable of being a transition destination are correlated to each connection status of the plurality of power supply switch units before transition; and the power supply switch control circuit, each time accepting the notification signal, regards the current connection status as the connection status before transition, and accordingly, from the power supply control information, determines any one of the plurality of connection statuses capable of being a transition destination to be the connection status to be the transition destination, and accordingly controls each of the plurality of power supply switch units to transit to the determined connection status.

(Supplementary Note 5)

The semiconductor integrated circuit according to supplementary note 4, which is characterized by that:

the power supply control information is correlated with each of the plurality of connection statuses capable of being a transition destination, and with a plurality of pieces of pattern information each specifying a group of connection statuses including the connection statuses capable of being a transition destination; and the power supply switch control circuit determines the connection status to be the transition destination from the power supply control information, on the basis of the current connection status and a predesignated one of the plurality of pieces of pattern information.

(Supplementary Note 6)

The semiconductor integrated circuit according to supplementary note 5, which is characterized by that each of the plurality of processing circuits updates the pattern information designation via the data and address buses.

(Supplementary Note 7)

The semiconductor integrated circuit according to any one of supplementary notes 1 to 6, which is characterized by that the power supply switch control circuit further stores a mask bit for defining a processing circuit whose notification signal is invalidated, among the plurality of processing circuits, and does not change its control of the plurality of power supply switch units even if receiving the notification signal from the processing circuit invalidated by the mask bit.

(Supplementary Note 8)

The semiconductor integrated circuit according to any one of supplementary notes 1 to 7, which is characterized by that the power supply switch control circuit has a connection unit for a first control signal from the outside, and when the first control signal is in the active state, does not cause the connection state of each of the plurality of power supply switch units to transit even if receiving the notification signal from any of the plurality of processing circuits.

(Supplementary Note 9)

The semiconductor integrated circuit according to any one of supplementary notes 1 to 8, which is characterized by that the power supply switch control circuit has a connection unit for a second control signal from the outside, and performs control to connect all of the plurality of power supply switch units to the power supply source when the second control signal is in the active state.

(Supplementary Note 10)

A power supply control method for semiconductor integrated circuit, which is characterized by that it is a power control method for a semiconductor integrated circuit comprising:

a plurality of processing circuits each including a notification unit for outputting a notification signal according to the processing state of the own processing circuit;

a plurality of power supply switch units for switching the connection states, which each are either a connected or a disconnected state, between respective ones of the plurality of processing circuits and a power supply source;

a power supply switch control circuit which is connected with the notification units included in respective ones of the plurality of processing circuits, stores power supply control information including the connection states of respective ones of the power supply switch units, and controls the connection states on the basis of the notification signals and the power supply control information; and data and address buses which connect each of the plurality of processing circuits with the power supply switch control circuit, wherein:

at least two or more of the plurality of processing circuits update the power supply control information via the data and address buses before the power supply switch connecting the updating processing circuit with the power supply source is turned off; and the power supply switch control circuit accepts a notification signal outputted from any one of the plurality of processing circuits after the update, and accordingly controls the connection states of respective ones of the plurality of power supply switch units on the basis of the updated power supply control information.

(Supplementary Note 11)

The semiconductor integrated circuit according to supplementary note 3, which is characterized by that the power supply control information includes individual connection states of the plurality of power supply switch units in the connection status to be the transition destination are correlated to each of the processing circuits to be an output source of the notification signal.

The present invention has been described above, with reference to the exemplary embodiments, but the present invention is not limited by the above description. To the configurations and details of the present invention, various changes and modifications which are understandable to those skilled in the art may be made within the scope of the present invention.

This application is based upon and claims the benefit of priority from Japanese Patent Application No. 2013-102502, filed on May 14, 2013, the disclosure of which is incorporated herein in its entirety by reference.

REFERENCE SIGNS LIST 100 semiconductor integrated circuit
10 power supply switch control circuit
101 power supply control information
11 processing circuit
111 notification unit
12 processing circuit
121 notification unit
13 processing circuit
131 notification unit
SW1 power supply switch
SW2 power supply switch
SW3 power supply switch
Ps1 notification signal
Ps2 notification signal
Ps3 notification signal
200 semiconductor integrated circuit
20 PMU
21 memory
22 power supply control table
C1 circuit
C2 circuit
C3 circuit
A1 process
A2 process
A3 process
A4 process
B1 process
B2 process
B3 process
B4 process
900 semiconductor integrated circuit
901 semiconductor integrated circuit
902 semiconductor integrated circuit
90 power supply management unit (PMU)
91 power supply management unit (PMU)
SW power supply switch
CB circuit block
C91 circuit
C92 circuit
C93 circuit
Vdd power supply source
BS address and data buses

The invention claimed is:

1. A semiconductor integrated circuit comprising:
a plurality of processing circuits each including a notification unit which outputs a notification signal according to processing state of the own processing circuit;
a plurality of power supply switch units which switch connection states, which each are either a connected or a disconnected state, between respective ones of the plurality of processing circuits and a power supply source;
a power supply switch control circuit which is connected with the notification unit included in respective ones of the plurality of processing circuits, stores power supply control information including the connection states of respective ones of the power supply switch units, and controls the connection states on the basis of the notification signals and the power supply control information; and
data and address buses which connect each of the plurality of processing circuits with the power supply switch control circuit,
wherein:
at least two or more of the plurality of processing circuits update the power supply control information via the data and address buses before outputting the notification signal; and
the power supply switch control circuit accepts a notification signal outputted from any one of the plurality of processing circuits after the update, and controls the connection states of respective ones of the plurality of power supply switch units on the basis of the updated power supply control information.

2. The semiconductor integrated circuit according to claim 1, wherein:
the plurality of processing circuits include at least a memory circuit storing instruction code and data, and a process execution circuit for executing a process on the basis of the instruction code and data stored in the memory circuit; and
the at least two or more processing circuits include a processing circuit other than the process execution circuit.

3. The semiconductor integrated circuit according to claim 1, wherein
the power supply switch control circuit, each time accepting the notification signal, in accordance with the current connection status of the plurality of power supply switch units, determines a connection status to be a transition destination, and controls each of the plurality of power supply switch units to transit to the determined connection status.

4. The semiconductor integrated circuit according to claim 3, wherein
in the power supply control information, a plurality of connection statuses capable of being a transition destination are correlated to each connection status of the plurality of power supply switch units before transition; and
the power supply switch control circuit, each time accepting the notification signal, regards the current connection status as the connection status before transition, and accordingly, from the power supply control information, determines any one of the plurality of connection statuses capable of being a transition destination to be the connection status to be the transition destination, and accordingly controls each of the plurality of power supply switch units to transit to the determined connection status.

5. The semiconductor integrated circuit according to claim 4, wherein
the power supply control information is correlated with each of the plurality of connection statuses capable of being a transition destination, and with a plurality of pieces of pattern information each specifying a group of connection statuses including the connection statuses capable of being a transition destination; and
the power supply switch control circuit determines the connection status to be the transition destination from the power supply control information, on the basis of the current connection status and a predesignated one of the plurality of pieces of pattern information.

6. The semiconductor integrated circuit according to claim 5, wherein
each of the plurality of processing circuits updates pattern information designation via the data and address buses.

7. The semiconductor integrated circuit according to claim 1, wherein
the power supply switch control circuit
further stores a mask bit for defining a processing circuit whose notification signal is invalidated, among the plurality of processing circuits, and
does not change its control of the plurality of power supply switch units even if receiving the notification signal from the processing circuit invalidated by the mask bit.

8. The semiconductor integrated circuit according to claim 1, wherein
the power supply switch control circuit
has a connection unit for a first control signal from outside, and
when the first control signal is in an active state, does not cause the connection state of each of the plurality of power supply switch units to transit even if receiving the notification signal from any of the plurality of processing circuits.

9. The semiconductor integrated circuit according to claim 1, wherein
the power supply switch control circuit
has a connection unit for a second control signal from outside, and
performs control to connect all of the plurality of power supply switch units to the power supply source when the second control signal is in an active state.

10. A power supply control method for a semiconductor integrated circuit, the semiconductor integrated circuit comprising:
a plurality of processing circuits each including a notification unit which outputs a notification signal according to processing state of the own processing circuit;
a plurality of power supply switch units which switch connection states, which each are either a connected or a disconnected state, between respective ones of the plurality of processing circuits and a power supply source;
a power supply switch control circuit which is connected with the notification unit included in respective ones of the plurality of processing circuits, stores power supply control information including the connection states of respective ones of the power supply switch units, and controls the connection states on the basis of the notification signals and the power supply control information; and
data and address buses which connect each of the plurality of processing circuits with the power supply switch control circuit,
wherein:
the plurality of processing circuits include at least a memory circuit storing instruction code and data, and a process execution circuit for executing a process on the basis of the instruction code and data stored in the memory circuit;
at least two or more of the plurality of processing circuits update the power supply control information via the data and address buses before the power supply switch connecting the updating processing circuit with the power supply source is turned off; and
the power supply switch control circuit
accepts a notification signal outputted from any one of the plurality of processing circuits after the update, and controls the connection states of respective ones of the plurality of power supply switch units on the basis of the updated power supply control information.

* * * * *